United States Patent [19]

Yamamoto et al.

[11] 4,391,874

[45] Jul. 5, 1983

[54] MAGNETIC RECORDING MEDIUM

[75] Inventors: Nobuyuki Yamamoto; Kyoichi Naruo; Tsutomu Okita, all of Fujinomiya, Japan

[73] Assignee: Fuji Photo Film Co., Ltd., Kanagawa, Japan

[21] Appl. No.: 350,510

[22] Filed: Feb. 19, 1982

[30] Foreign Application Priority Data

Feb. 19, 1981 [JP] Japan .................................. 56-23520

[51] Int. Cl.³ ...................... B32B 15/08; H01F 10/00
[52] U.S. Cl. .................................... 428/336; 428/457; 428/694; 428/695; 428/900
[58] Field of Search ..................... 428/900, 425.8, 695, 428/336, 694; 427/127–132, 48

[56] References Cited

U.S. PATENT DOCUMENTS

| | | | |
|---|---|---|---|
| 4,152,469 | 5/1979 | Allen et al. | 427/131 X |
| 4,152,487 | 5/1979 | Yanagisawa | 428/621 |
| 4,272,563 | 6/1981 | Steck et al. | 427/131 X |

*Primary Examiner*—Bernard D. Pianalto
*Attorney, Agent, or Firm*—Sughrue, Mion, Zinn, Macpeak and Seas

[57] ABSTRACT

A magnetic recording medium having a thin magnetic film on a non-magnetic support base is disclosed. A layer of isocyanic acid ester is formed in connection with the medium, and may be formed on either the surface of the metal film or the surface of the base opposite the metal film or both. The resulting medium has excellent running properties, wear resistance and electro-to-magnetic conversion characteristics which are maintained after repeated use.

12 Claims, No Drawings

MAGNETIC RECORDING MEDIUM

FIELD OF THE INVENTION

The present invention relates to a magnetic recording medium using a thin magnetic film as a magnetic recording layer and, more particularly, to a magnetic recording medium of thin metal film type having good running properties, wear resistance and electro-to-magnetic conversion characteristics.

BACKGROUND OF THE INVENTION

Most of the conventional magnetic recording media are of the coated type which is produced by dispersing particles of magnetic oxides such as $\gamma$-$Fe_2O_3$, Co-doped $\gamma$-$Fe_2O_3$, $Fe_3O_4$, Co-doped $Fe_3O_4$, a Berthollide compound of $\gamma$-$Fe_2O_3$ and $Fe_3O_4$, $CrO_2$, etc., or ferromagnetic alloy particles in an organic binder such as a vinyl chloride/vinyl acetate copolymer, a styrene/butadiene copolymer, an epoxy resin or polyurethane resin, applying the resulting coating solution to a non-magnetic base, and drying the coating. However, due to a recent increase in the demand for higher density recording, researchers' attention has been drawn to magnetic recording media of the thin metal film type that uses as a magnetic recording layer a thin ferromagnetic metal film that is formed by the vapor deposition such as vacuum deposition, sputtering or ion plating, or the plating such as electroplating or electrolessplating, and various efforts have been made to use such recording media on a commercial basis.

Most magnetic recording media of the coated type use a metal oxide having a small saturation magnetization as a magnetic material. Therefore, an attempt to achieve high density recording by using a thinner magnetic recording medium results in a decreased signal output. When using a magnetic recording medium of thin metal film type, a very thin magnetic recording layer can be formed by using a ferromagnetic metal having a greater saturation magnetization than that of the magnetic oxide without using a non-magnetic material such as a binder. This thinness is very advantageous for providing good electro-to-magnetic conversion characteristics. However, the thin metal film type magnetic recording medium has its own problems: (1) it develops a large amount of friction against the magnetic head, guide poles or other transport means when it is run to record, reproduce or erase magnetic signals, and hence wears easily; (2) it is easily attacked by corrosive environments; and (3) the magnetic recording layer may be damaged by impacts during handling.

Some attempts have been made to solve these problems by forming a protective layer on the magnetic recording medium of thin metal film type. One such proposal is described in Japanese Patent Application (OPI) No. 75001/75 (the term "OPI" as used herein refers to a "published unexamined Japanese patent application") wherein a thin lubricant layer is formed on the metal film. According to this proposal, the friction coefficient between the magnetic head or guide poles and the metal film is reduced, providing a tape that runs consistently and which is least likely to be abraded. However, these advantages are quickly lost if the tape is used repeatedly. Another method is described in Japanese Patent Application (OPI) Nos. 39708/78 and 40505/78 wherein a lubricant protective layer made of a metal or metal oxide is formed on the thin metal film, but even in this case, the effect of the protective layer does not last long and as the tape is used repeatedly, the friction coefficient is increased rapidly or the thin magnetic metal film breaks. Still another method is described in Japanese Patent Application (OPI) No. 155010/79 wherein an overcoat of a high molecular film is formed on the metal film. However, if the overcoat is made of vinylidene chloride/acrylic ester copolymer and other known high molecular substances, the resulting film thickness is at least about $0.2\mu$ and this causes spacing loss which in turn leads to reduced output in high density recording.

Further, most thin magnetic metal films are supported on a very smooth base to achieve high density recording. However, even when the lubricating methods described above are applied to such a smooth base, running properties, especially in highly humid atmospheres, and wear resistance of the base cannot satisfactorily be improved.

SUMMARY OF THE INVENTION

Therefore, one object of the present invention is to provide a magnetic recording medium of the thin metal film type that has good running properties, wear resistance and electro-to-magnetic conversion characteristics.

Another object of the present invention is to provide a magnetic recording medium of thin metal film type that retains good running properties and wear resistance for an extended period of time.

The present inventors have found that by forming a layer of an isocyanic acid ester on either the thin magnetic metal film or the surface of the non-magnetic base opposite the thin magnetic metal film or both, a magnetic recording medium having good electro-to-magnetic conversion characteristics, running properties, wear resistance, and great abrasion-proofness can be produced. Furthermore, these properties last for an extended period.

DETAILED DESCRIPTION OF THE INVENTION

The thin magnetic metal film used in the present invention can be formed by vapor deposition or plating. The vapor deposition is preferred since it forms the desired thin metal film rapidly, is a relatively simple process, and requires no treatment of effluents or other additional steps. The vapor deposition is a process in which a substance or its compound is heated in a vacuum enclosure until its vapor or ionized vapor condenses on the surface of a base, and includes vacuum vapor deposition, sputtering, ion plating and chemical vapor phase plating.

The magnetic recording layer used in the present invention is a thin film that is formed by vapor deposition or plating of a ferromagnetic metal such as iron, cobalt or nickel, or a ferromagnetic alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, or Co-Sm-Cu. The thickness of the layer as used in a magnetic recording medium is preferably in the range of from 0.05 to 2 $\mu$m, more preferably from 0.1 to 0.4 $\mu$m.

The isocyanic acid ester which can be used in the present invention is a compound having the formula $RN=C=O$, wherein R is an alkyl group, preferably a straight alkyl group, and more preferably a straight alkyl group having 8 or more carbon atoms. Specific examples are octyl isocyanate, decyl isocyanate, dodecyl isocyanate and octadecyl isocyanate.

A layer of the isocyanic acid ester can be formed on either the thin magnetic metal film or the non-magnetic base or both by a suitable method, for example, by applying a solution of said ester in an organic solvent onto the base and drying the same. The concentration of the coating solution is preferably in the range of from 0.05 to 5 wt%, and said solution is applied onto the base in such a manner that the dry weight of the layer is preferably in the range of from 1 to 50 mg/m$^2$, more preferably from 2 to 10 mg/m$^2$. After drying the isocyanic acid ester layer, it is preferably heated at 30° C. or more and at least 60% RH (relative humidity) for at least 10 seconds, whereby the effects in running properties and wear resistance of the isocyanic acid ester layer can be maintained in a longer period of time.

For the purposes of the present invention, the isocyanic acid ester may be used in combination with a lubricant. Suitable lubricants include aliphatic acids, metal soaps, aliphatic acid amides, aliphatic acid esters, mineral oils, vegetable oils, animal oils such as whale oil, higher alcohols, and silicone oil; fine, electrically conductive particulate materials such as graphite; fine inorganic particulate materials such as molybdenum disulfide and tungsten disulfide; fine particles of plastics such as polyethylene, polypropylene, polyethylene/vinyl chloride copolymer and polytetrafluoroethylene; α-olefin polymers; unsaturated aliphatic hydrocarbons that are liquid at ordinary temperatures (i.e., those compounds having an n-olefin double bond attached to a terminal carbon atom, with about 20 carbon atoms), fluorocarbons and mixtures thereof. In addition to the lubricant, a conventional corrosion inhibitor or mold inhibitor may be used as desired.

These lubricants are dissolved in an organic solvent together with the isocyanic acid ester, and the solution is applied onto the base. Alternatively, after the layer of the isocyanic acid ester is formed by the methods described above, a lubricant layer may be formed by applying a solution of the lubricant in an organic solvent onto the layer, or by the vapor deposition process described before.

Examples of solvents used for the application of the isocyanic acid ester as well as the lubricant include ketones such as acetone, methyl ethyl ketone, methyl isobutyl ketone and cyclohexanone; esters such as methyl acetate, ethyl acetate, butyl acetate, ethyl lactate, and glycol acetate monoethyl ether; ether and glycol ethers such as glycol dimethyl ether, glycol monoethyl ether and dioxane; hydrocarbons such as pentane, hexane, heptane, octane, nonane and decane; tars (aromatic hydrocarbons) such as benzene, toluene and xylene; and chlorinated hydrocarbons such as methylene chloride, ethylene chloride, carbon tetrachloride, chloroform, ethylene chlorohydrin and dichlorobenzene.

The lubricant is generally used in a dry weight of from 2 to 200 mg/m$^2$, preferably from 5 to 100 mg/m$^2$.

The recording medium of the present invention achieves the following advantages:

(1) When it is used on a tape deck, it experiences only a small increase in the dynamic friction coefficient. This means the medium is very stable to repeated running and has very high wear resistance;

(2) The medium retains high stability to repeated running even when it has a very smooth thin magnetic metal film and base;

(3) The medium has small dynamic friction coefficient and runs smoothly in humid atmospheres;

(4) The film of the isocyanic acid ester is very thin, so it does not reduce the electro-to-magnetic conversion characteristics of the magnetic recording medium; and (5) The medium is hardly susceptible to corrosive attack under humid conditions and causes no reduction in the electro-to-magnetic conversion characteristics.

The present invention is now described in greater detail by reference to the following examples and comparative examples which are given here for illustrative purposes only and are by no means intended to limit the scope of the invention. In the examples and comparative examples, all parts are by weight.

EXAMPLE 1

A magnetic cobalt film (0.2μ thick) was formed on a polyethylene terephthalate film (20μ thick) by oblique deposition to thereby prepare a magnetic tape, wherein electron beams were used to condense the vapor of cobalt (99.95% purity) which was directed onto the PET film at an angle of incidence of 70° at a pressure of $5 \times 10^{-5}$ Torr. An isocyanic acid ester coating solution I of the formulation indicated below was applied onto the Co film and the base film in a dry amount of 10 mg/m$^2$, and was allowed to stand at 50° C. and 80% RH for 2 hours. The resulting tape was then slit into a video tape ½ inch wide, the magnetic surface and the base surface of which were referred to as Sample Nos. 1 and 2, respectively.

| Isocyanic Acid Ester Coating Solution I | |
|---|---|
| Octadecyl isocyanate [CH$_3$(CH$_2$)$_{17}$NCO] | 1.0 part |
| Methyl ethyl ketone | 200 parts |

EXAMPLE 2

A magnetic tape was prepared in the same manner as in Example 1. Thereafter, an isocyanic acid ester coating solution II of the formulation indicated below was applied onto a cobalt film of the magnetic tape in a dry amount of 4 mg/m$^2$, and was allowed to stand at 30° C. and 60% RH for 30 minutes. The resulting tape was then slit into a video tape ½ inch wide, the magnetic surface of which was referred to as Sample No. 3.

| Isocyanic Acid Ester Coating Solution II | |
|---|---|
| Octyl isocyanate [CH$_3$(CH$_2$)$_7$NCO] | 0.4 part |
| Methyl ethyl ketone | 200 parts |

EXAMPLE 3

A magnetic tape was prepared in the same manner as in Example 1. Thereafter, an isocyanic acid ester coating solution III of the formulation indicated below was applied onto a base film of the magnetic tape in a dry amount of 6 mg/m$^2$, and was allowed to stand at 40° C. and 70% RH for 1 hour. The resulting tape was then slit into a video tape ½ inch wide, the base surface of which was referred to as Sample No. 4.

the dynamic friction coefficient was conducted with the tapes of Examples 1 and 3 and that of Comparative Example 1 (see Sample Nos. 2, 4 and C-3).

TABLE 1

| Sample No. | Sliding Face | Protective Layer | (1) Durability* after 500 Passes | (2) Change in Dynamic Friction Coefficient | | | |
|---|---|---|---|---|---|---|---|
| | | | | 1 | 20 | 100 | 500 |
| 1 | Magnetic surface | $CH_3(CH_2)_{17}NCO$ | No abrasion observed | 0.30 | 0.31 | 0.33 | 0.36 |
| 2 | Base surface | $CH_3(CH_2)_{17}NCO$ | — | 0.30 | 0.31 | 0.33 | 0.37 |
| 3 | Magnetic surface | $CH_3(CH_2)_7NCO$ | No abrasion observed | 0.31 | 0.32 | 0.35 | 0.41 |
| 4 | Base surface | $CH_3(CH_2)_{11}NCO$ | — | 0.30 | 0.31 | 0.34 | 0.40 |
| C-1 | Magnetic surface | — | More than 10 deep abrasions | 0.48 | 0.55 | 0.58 | 0.67 |
| C-2 | Magnetic surface | $CH_3(CH_2)_{16}COOH$ | More than 10 deep abrasions | 0.30 | 0.33 | 0.41 | 0.48 |
| C-3 | Base surface | — | — | 0.35 | 0.40 | 0.57 | 0.59 |

*The durability was expressed in terms of the number of abrasions which appeared over the whole width of the tape at an optical portion of the tape.

| Isocyanic Acid Ester Coating Solution III | |
|---|---|
| Dodecyl isocyanate [$CH_3(CH_2)_{11}NCO$] | 0.6 part |
| Methyl ethyl ketone | 200 parts |

COMPARATIVE EXAMPLE 1

A video tape was prepared as in Example 1 except that a Co magnetic film was simply formed on a PET base by oblique deposition without forming a protective layer or a lubricant layer. The magnetic surface and the base surface of the tape were referred to as Sample Nos. C-1 and C-3.

COMPARATIVE EXAMPLE 2

A video tape ½ inch wide was prepared as in Example 1 except that the isocyanic acid ester coating solution I was replaced by a lubricant coating solution IV of the following formulation. The magnetic surface of the tape was referred to as Sample No. C-2.

| Lubricant Coating Solution IV | |
|---|---|
| Stearic acid [$CH_3(CH_2)_{16}COOH$] | 1.0 part |
| Methyl ethyl ketone | 200 parts |

The samples thus prepared were subjected to the following film durability (wear resistance) test and measurement of dynamic friction coefficient.

(1) Durability

Durability of a magnetic thin film was determined when pressing a magnetic tape against a magnetic head at a tension of 90 g/½ inch and reciprocating at 38 cm/sec 500 times. The number of visually observed abrasions that were formed on the magnetic surface was counted.

(2) Measurement of Dynamic Friction Coefficient

The magnetic tape was reciprocated on a VHS video tape recorder (Maclord 88, Model NV-8800, of Matsushita Electric Industrial Co., Ltd.) once, 20 times, 100 times and 500 times, and the change in the dynamic friction coefficient ($\mu$) was examined by the formula $T_2/T_1 = e^{\mu\pi}$ wherein $T_1$ was the tape tension at the supply side of the rotary cylinder and $T_2$ at the takeup side.

The test and measurement results are shown in Table 1. As for the surface of the base, only measurement of As the data in Table 1 shows, the magnetic recording medium of thin metal film type according to the present invention has very good running properties and wear resistance. Furthermore, the improvement in these properties is maintained for an extended period of time. For this reason, the medium is a product having high commercial value.

Higher fatty acids (RCOOH) have been known as lubricants for reducing the dynamic friction coefficient of metals. They are particularly effective for metals with which the fatty acids can react to be oriented and fixed on the metals, so that the dynamic friction coefficient of the metals is kept at a low level even after repeated running. However, the fatty acids do not tend to react with a thin magnetic metal film and are merely physically adsorbed on the magnetic metal film. Therefore the fatty acids are easily rubbed off from the magnetic metal film, so that the dynamic friction coefficient of the magnetic metal film increases upon repeated running and the magnetic metal film cannot be prevented from abrasion as shown in Sample No. C-2. On the other hand, the isocyanic acid esters (RN=C=O) of the present invention can effectively maintain the dynamic friction coefficient of the magnetic metal film at a low level after repeated running and provide excellent wear resistance as shown in Sample Nos. 1 and 3. Though it is not desired to be bound, this would be because the isocyanate group of the isocyanic acid ester reacts with a hydroxy group which is present on the surface of the thin magnetic metal film whereby the isocyanic acid ester is fixed on the metal film, and the residual R group of the isocyanic acid ester reduces the dynamic friction coefficient. Surprisingly, the isocyanic acid ester of the present invention is also effective for improvement in the running properties of the base surface as shown in Sample Nos. 2 and 4.

While the invention has been described in detail and with reference to specific embodiments thereof, it will be apparent to one skilled in the art that various changes and modifications can be made therein without departing from the spirit and scope thereof.

What is claimed is:
1. A magnetic recording medium, comprising: a non-magnetic support base;

a thin magnetic metal film formed on a surface of said non-magnetic support base; and a layer of an isocyanic acid ester having the formula RN=C=O, wherein R is an alkyl group.

2. A magnetic recording medium as claimed in claim 1, wherein said layer of isocyanic acid ester is formed on an outer surface of said thin magnetic metal film.

3. A magnetic recording medium as claimed in any of claims 1 or 2, wherein said layer of isocyanic acid ester is formed on a surface of said non-magnetic support base opposite to said surface on which said thin magnetic metal film is formed.

4. A magnetic recording medium as claimed in claim 1, wherein said thin magnetic metal film has a thickness within the range of 0.05 to 2 μm.

5. A magnetic recording medium as claimed in claim 4, wherein said thickness is within the range of 0.1 to 0.4 μm.

6. A magnetic recording medium as claimed in claim 1, wherein said alkyl group is a straight chain alkyl group having 8 or more carbon atoms.

7. A magnetic recording medium as claimed in claim 6, wherein said isocyanic acid ester is selected from the group consisting of octyl isocyanate, decyl isocyanate, dodecyl isocyanate and octadecyl isocyanate.

8. A magnetic recording medium as claimed in claim 1, wherein said layer of isocyanic acid ester has a dry weight within the range of 1 to 50 mg/m$^2$.

9. A magnetic recording medium as claimed in claim 8, wherein said dry weight is within the range of from 2 to 10 mg/m$^2$.

10. A magnetic recording medium as claimed in claim 8, wherein said alkyl group of the isocyanic acid ester is a straight chain alkyl group having 8 to 18 carbon atoms.

11. A magnetic recording medium as claimed in claim 10, wherein said isocyanic acid ester is selected from the group consisting of octyl isocyanate, decyl isocyanate, dodecyl isocyanate and octadecyl isocyanate.

12. A magnetic recording medium as claimed in claim 11, wherein said thin magnetic metal film is composed of a ferromagnetic metal or alloy selected from the group consisting of Fe, Co, Ni, Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni,Na, Co-Ni-Ce, Co-Ni-Zn, Co-Ni-Cu, Co-Ni-W, Co-Ni-Re and Co-Sm-Cu.

* * * * *